United States Patent [19]
DeVoe et al.

[11] Patent Number: 6,077,601
[45] Date of Patent: Jun. 20, 2000

[54] COATED ABRASIVE ARTICLE

[75] Inventors: Robert J. DeVoe, Oakdale; Thomas M. Clausen, Minneapolis; Gregg D. Dahlke, St. Paul; Clayton A. George, Afton; Naimul Karim, Maplewood; Craig A. Masmar, West Lakeland Township, all of Minn.

[73] Assignee: 3M Innovative Properties Company, St. Paul, Minn.

[21] Appl. No.: 09/070,976

[22] Filed: May 1, 1998

[51] Int. Cl.[7] ...................................................... B32B 5/16
[52] U.S. Cl. .......................... 428/323; 428/327; 428/343; 428/345; 428/355 R; 428/413
[58] Field of Search .................................... 428/323, 327, 428/343, 345, 355 R, 413; 525/108; 430/913, 914

[56] References Cited

U.S. PATENT DOCUMENTS

| | | |
|---|---|---|
| 2,071,549 | 2/1937 | Mahlman . |
| 2,128,905 | 9/1938 | Benner et al. . |
| 2,128,907 | 9/1938 | Benner et al. . |
| 2,958,593 | 11/1960 | Hoover et al. . |
| 3,018,262 | 1/1962 | Schroeder . |

(List continued on next page.)

FOREIGN PATENT DOCUMENTS

| | | |
|---|---|---|
| 0 209 859 A2 | 1/1987 | European Pat. Off. . |
| 0 281 354 A2 | 9/1988 | European Pat. Off. . |
| 0 289 632 A1 | 11/1988 | European Pat. Off. . |
| 0 396 150 A2 | 11/1990 | European Pat. Off. . |
| 0 447 115 A1 | 9/1991 | European Pat. Off. . |
| 0 486 308 A2 | 5/1992 | European Pat. Off. . |
| 0 500 009 A1 | 8/1992 | European Pat. Off. . |
| 0 560 018 A1 | 9/1993 | European Pat. Off. . |
| 0 620 259 A2 | 10/1994 | European Pat. Off. . |
| 0 654 323 A1 | 5/1995 | European Pat. Off. . |
| 0 721 975 A1 | 7/1996 | European Pat. Off. . |
| 0 747 170 A2 | 12/1996 | European Pat. Off. . |
| 0 819 747 A1 | 1/1998 | European Pat. Off. . |
| 3243383 | 5/1984 | Germany . |
| 39 38 376 A1 | 5/1991 | Germany . |
| 19541923 | 5/1997 | Germany . |
| 53042280 | 4/1978 | Japan . |
| 56-122823 | 9/1981 | Japan . |
| 57-25379 | 2/1982 | Japan . |
| 60137980 | 7/1985 | Japan . |
| 60228527 | 11/1985 | Japan . |
| 63-144964 | 6/1988 | Japan . |
| 1098660 | 4/1989 | Japan . |
| 52-75842 | 10/1993 | Japan . |
| 8-85780 | 4/1996 | Japan . |
| 9-176599 | 7/1997 | Japan . |
| 9-176600 | 7/1997 | Japan . |
| 9-183957 | 7/1997 | Japan . |
| 9-235390 | 9/1997 | Japan . |
| 1183519 | 10/1985 | U.S.S.R. . |
| 2 091 736 | 8/1982 | United Kingdom . |
| 2 138 008 | 10/1984 | United Kingdom . |
| WO 92/20754 | 11/1992 | WIPO . |
| WO 93/11200 | 6/1993 | WIPO . |
| WO 93/23487 | 11/1993 | WIPO . |
| WO 97/12929 | 4/1997 | WIPO . |
| WO 97/25185 | 7/1997 | WIPO . |
| WO 97/42004 | 11/1997 | WIPO . |
| WO 98/12021 | 3/1998 | WIPO . |

*Primary Examiner*—William Krynski
*Assistant Examiner*—Hong J. Xu
*Attorney, Agent, or Firm*—Scott A. Bardell

[57] ABSTRACT

A coated abrasive article comprises a backing, a first binder on the backing, and a plurality of abrasive particles in the first binder. The first binder precursor is an energy-curable preferably, melt-processable resin containing an epoxy resin, an ethylene-vinyl acetate copolymer, and a curing agent for crosslinking the epoxy resin that is cured to provide a crosslinked make coating. The above binder precursors of the invention are preferably free of homopolymers and copolymers of olefinic monomers. In another aspect, the invention also describes an energy curable first binder precursor containing an epoxy resin, an ethylene-vinyl acetate copolymer, a polyfunctional acrylate component and a curing agent for crosslinking the epoxy resin that is cured to provide a crosslinked make coating. The invention also relates to a method of producing such coated abrasive articles and a surface-treated backing material.

38 Claims, 1 Drawing Sheet

6,077,601
Page 2

U.S. PATENT DOCUMENTS

| | | |
|---|---|---|
| 3,117,099 | 1/1964 | Proops et al. . |
| 3,464,948 | 9/1969 | Russell . |
| 3,641,195 | 2/1972 | Ball et al. . |
| 4,009,224 | 2/1977 | Warnken . |
| 4,026,705 | 5/1977 | Crivello et al. . |
| 4,028,393 | 6/1977 | Rottloff et al. . |
| 4,058,401 | 11/1977 | Crivello . |
| 4,173,476 | 11/1979 | Smith et al. . |
| 4,250,053 | 2/1981 | Smith . |
| 4,256,828 | 3/1981 | Smith . |
| 4,312,902 | 1/1982 | Murase et al. . |
| 4,427,481 | 1/1984 | Smith et al. . |
| 4,517,340 | 5/1985 | Read et al. . |
| 4,560,579 | 12/1985 | Siadat et al. . |
| 4,612,209 | 9/1986 | Forgo et al. . |
| 4,652,275 | 3/1987 | Bloecher et al. . |
| 4,684,678 | 8/1987 | Schultz et al. . |
| 4,693,775 | 9/1987 | Harrison et al. . |
| 4,708,996 | 11/1987 | Hoffman et al. . |
| 4,751,138 | 6/1988 | Tumey et al. . |
| 4,789,712 | 12/1988 | Hoffman et al. . |
| 4,799,939 | 1/1989 | Bloecher et al. . |
| 4,850,871 | 7/1989 | Bryan . |
| 4,903,440 | 2/1990 | Larson et al. . |
| 4,920,182 | 4/1990 | Manser et al. . |
| 4,933,219 | 6/1990 | Sakumoto et al. . |
| 4,991,362 | 2/1991 | Heyer et al. . |
| 4,997,717 | 3/1991 | Rembold et al. . |
| 5,059,701 | 10/1991 | Keipert . |
| 5,071,914 | 12/1991 | Zimmel et al. . |
| 5,089,536 | 2/1992 | Palazzotto . |
| 5,095,046 | 3/1992 | Tse . |
| 5,191,101 | 3/1993 | Palazzotto et al. . |
| 5,215,860 | 6/1993 | McCormick et al. . |
| 5,236,472 | 8/1993 | Kirk et al. . |
| 5,242,980 | 9/1993 | Tse . |
| 5,252,694 | 10/1993 | Willett et al. . |
| 5,294,517 | 3/1994 | McCormick et al. . |
| 5,387,492 | 2/1995 | McCormick et al. . |
| 5,407,978 | 4/1995 | Bymark et al. . |
| 5,412,000 | 5/1995 | Hellmann et al. ................ 523/437 |
| 5,436,063 | 7/1995 | Follett et al. . |
| 5,507,850 | 4/1996 | Helmin . |
| 5,523,152 | 6/1996 | Thurber et al. . |
| 5,558,911 | 9/1996 | Blum . |
| 5,703,198 | 12/1997 | Twigt et al. . |
| 5,704,952 | 1/1998 | Law et al. . |
| 5,709,948 | 1/1998 | Perez et al. . |
| 5,730,764 | 3/1998 | Williamson et al. ................ 51/295 |

COATED ABRASIVE ARTICLE

FIELD OF THE INVENTION

This invention relates to coated abrasive articles and more particularly, to such articles which incorporate energy curable compositions containing an epoxy resin and an ethylene vinyl acetate copolymer or an epoxy resin, an ethylene vinyl acetate copolymer and an acrylate.

BACKGROUND OF THE INVENTION

Coated abrasives generally comprise a flexible backing upon which a binder supports a coating of abrasive particles. The abrasive particles are typically secured to the backing by a first binder, commonly referred to as a make coat. Additionally, the abrasive particles are generally oriented with their longest dimension perpendicular to the backing to provide an optimum cut rate. A second binder, commonly referred to as a size coat, is then applied over the make coat and the abrasive particles to anchor the particles to the backing.

Porous cloth, fabric and textile materials are frequently used as backings for coated abrasive articles. The make coat precursor is typically applied to the backing as a low viscosity material. In this condition, the make coat precursor can infiltrate into the interstices of the porous backing leaving an insufficient coating thickness making it difficult to bond the subsequently applied abrasive particles to the backing and, on curing, resulting in the backing becoming stiff, hard and brittle. As a result, it has become conventional to employ one or more treatment coats, such as a presize, saturant coat, backsize or a subsize coat, to seal the porous backing.

The presize, saturant coat, backsize and subsize coat typically involve thermally curable resinous adhesives, such as phenolic resins, epoxy resins, acrylate resins, acrylic latices, urethane resins, glue, starch and combinations thereof. A saturant coat saturates the cloth and fills pores, resulting in a less porous, stiffer cloth with more body. An increase in body provides an increase in strength and durability of the article. A presize coat, which is applied to the front side of the backing, may add bulk to the cloth and may improve adhesion of subsequent coatings. A backsize coat, which is applied to the back side of the backing, that is, the side opposite that to which the abrasive grains are applied, adds body to the backing and protects the yarns of the cloth from wear. A subsize coat is similar to a saturation coat except that it is applied to a previously treated backing. The drawback of such a presize, saturant coat, backsize and subsize coat is that it entails added processing step(s) which increase the cost and complexity of manufacturing. Similarly, paper backings may be treated to prevent penetration of make adhesives and/or to waterproof.

SUMMARY OF THE INVENTION

This invention generally relates to a coated abrasive article utilizing an improved make coat formulation. The coated abrasive article includes a backing, the improved make coat on the backing, and a plurality of abrasive particles at least partially embedded in the make coat. The make coat also may be referred to herein as the first binder.

The present invention provides a coated abrasive article, comprising:
  a) a backing having a front surface and a back surface;
  b) a crosslinked first binder on said front surface of said backing, wherein said first binder is formed from a first binder precursor, said first binder precursor is an energy-curable composition made by mixing the following components
    i) about 2 to about 99 weight percent of an epoxy resin, the weight percent being based on the total resin content;
    ii) about 1 to about 98 weight percent of an ethylene-vinyl acetate copolymer resin, the weight percent being based on the total resin content;
    iii) an effective amount of a curing agent for crosslinking said epoxy resin; and
  c) a plurality of abrasive particles, wherein said abrasive particles are at least partially embedded in said first binder.

The above binder precursor compositions of the invention are homogeneous in the molten state and are preferably free from, that is, do not contain, hydrocarbon polyolefin resins. "Hydrocarbon polyolefin resin" refers to a fully prepolymerized uncrosslinked polymeric hydrocarbon bearing essentially no organic functional groups, prepared from homopolymerization and/or copolymerization of an olefinic monomer(s). Such resins can be incompatible with epoxy resins and can cause phase separation of compositions containing an appreciable amount of epoxy resin. Examples of such resins include polyethylene, polypropylene, and the like, and poly(ethylene-co-propylene), poly(propylene-co-1-butene), and the like.

In another aspect, the present invention provides a coated abrasive article, comprising:
  a) a backing having a front surface and a back surface;
  b) a crosslinked first binder on said front surface of said backing, wherein said first binder is formed from a first binder precursor, said first binder precursor is an energy-curable composition made by mixing the following components
    i) about 2 to about 98 weight percent of an epoxy resin, the weight percent being based on the total resin content;
    ii) about 1 to about 90 weight percent of an ethylene-vinyl acetate copolymer resin, the weight percent being based on the total resin content;
    iii) about 0.1 to about 20 weight percent of a polyfunctional acrylate, the weight percent being based on the total resin content;
    iv) an effective amount of a curing agent for crosslinking said epoxy resin; and
  c) a plurality of abrasive particles, wherein said abrasive particles are at least partially embedded in said first binder.

In another aspect, the present invention provides an energy-curable composition made by mixing components comprising:
  a) an epoxy resin;
  b) an ethylene-vinyl acetate copolymer resin;
  c) a polyfunctional acrylate; and
  d) an effective amount of a curing agent for crosslinking said epoxy resin.

In another aspect, the present invention provides a presized backing for a coated abrasive article comprising:
  a) a backing suitable for use in a coated abrasive article; and
  b) a crosslinked presize layer on the backing formed from a presize binder precursor, wherein the presize binder precursor is an energy curable composition comprising:
    i) from about 30 to about 95 weight percent of an epoxy resin, the weight percent being based on the total resin content, ii) from about 5 to about 70 weight percent an ethylene-vinyl acetate copolymer resin, the weight percent being based on the total resin content, and iii) an effective amount of a curing agent for crosslinking said epoxy resin.

In another aspect, the present invention provides a presized backing for a coated abrasive article comprising:

a) a backing suitable for use in a coated abrasive article; and b) a crosslinked presize layer on the backing formed from a presize binder precursor, wherein the presize binder precursor is an energy curable composition comprising:

i) about 2 to about 98 weight percent of an epoxy resin, the weight percent being based on the total resin content, ii) about 1 to about 90 weight percent of an ethylene-vinyl acetate copolymer resin, the weight percent being based on the total resin content, iii) about 0.1 to about 20 weight percent of a polyfunctional acrylate component, the weight percent being based on the total resin content, and iv) an effective amount of a curing agent for crosslinking said epoxy resin.

The above binder precursors of the invention are preferably melt processable.

As used herein, a "hot melt" rhefers to a composition that is a solid at room temperature (about 20 to 22° C.) but which, upon heating, melts to a viscous liquid that can be readily applied to a coated abrasive article backing. A "melt processable" composition refers to a composition that can transform, for example, by heat and/or pressure, from a solid to a viscous liquid by melting, at which point it can be readily applied to a coated abrasive article backing. Both hot melt and melt processable resin compositions can be in the form of a solid film that is transfer coated to the backing. Desirably, the hot melt compositions of the invention can be formulated as solvent free systems (that is, they have less than 1% solvent in the solid state).

However if so desired, it may be feasible to incorporate solvent or other volatiles into the binder precursor. As used herein, a "pressure sensitive adhesive" refers to a hot melt composition that, at the time abrasive particles are applied thereto, displays pressure sensitive adhesive properties. "Pressure sensitive adhesive properties" means that the composition is tacky immediately after application to a backing and while still warm and, in some cases, even after it has cooled to room temperature. "EVA" means ethylene-vinyl acetate copolymer and "epoxy" means epoxide containing material or epoxy resin.

In a further embodiment of the present invention, a size coat, that is, a second binder, can be applied upon the make coat and abrasive particles to reinforce the attachment of the abrasive particles to the backing. A supersize coat, that is, a third binder, over the size coat, also may be used.

The make coat precursor or binder precursor may be in a solid form prior to coating and can be coated as a liquid solution or a molten mixture.

The invention additionally relates to use of the preferably energy curable, hot melt pressure sensitive first binder as a backing treatment coating for porous cloth materials to function, for example, as a saturant coat, a presize coat, a backsize coat, or as a subsize coat, to protect the cloth fibers and/or to seal the porous cloth material. If liquefied, the binder precursor can be coated as a size coat. Preferably, any backing treatment applied to the coatable side of the backing, for example, presize, is cured or crosslinked before a precursor and abrasive particles are applied to the treated surface of the backing. The cured coating or treatment on the backing is preferably substantially free of abrasive particles.

The binder precursors of the present invention also generally have a longer open time, better film-forming properties (which allows for formulating at lower levels), and lower cost than polyester/epoxy melt processable make resins. The binder precursors of the invention also have significant tack in the uncured state, controlled flow during curing, and desirable physical properties in the cured state, including adhesive and cohesive strength.

DETAILED DESCRIPTION OF THE PREFERRED EMBODIMENTS

Figure 1:
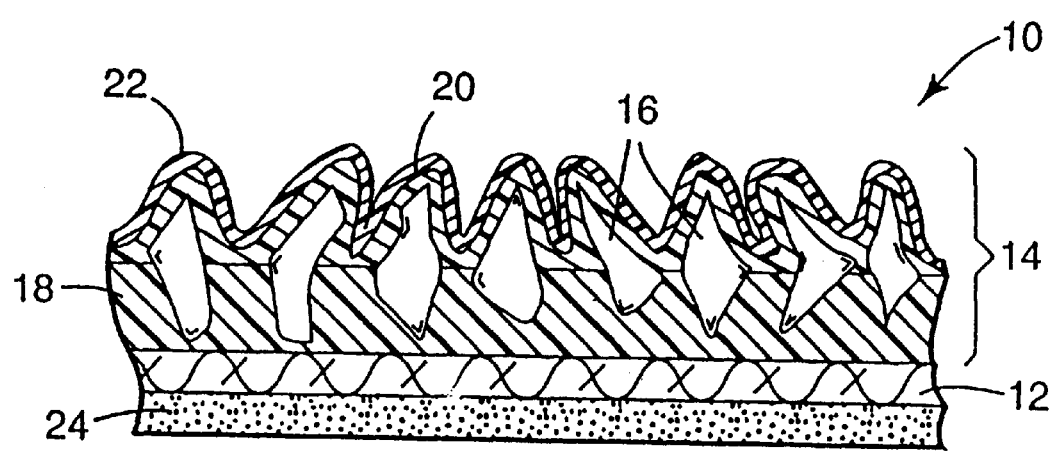
FIG. 1 is an enlarged sectional view of a segment of a coated abrasive article according to an embodiment of the invention.

Turning now to the drawings, FIG. 1 illustrates a coated abrasive article 10 according to the invention comprising a backing 12 and an abrasive layer 14 bonded thereto.

Backing 12 may be a conventional, sealed coated abrasive backing or a porous, non-sealed backing. Backing 12 may be comprised of cloth, vulcanized fiber, paper, nonwoven materials, fibrous reinforced thermoplastic backing, substrates containing hooked stems, looped fabrics, metal foils, mesh, foam backings, and laminated multilayer combinations thereof.

Cloth backings can be untreated, saturated, pre-sized, backsized, porous, or sealed, and they may be woven or stitch bonded. The cloth backings may include fibers or yarns of cotton, polyester, rayon, silk, nylon or blends thereof. The cloth backings can be provided as laminates with different backing materials described herein.

Paper backings also can be saturated, barrier coated, pre-sized, backsized, untreated, or fiber-reinforced. The paper backings also can be provided as laminates with a different type of backing material. Nonwoven backings include scrims and laminates to different backing materials mentioned herein. The nonwovens may be formed of cellulosic fibers, synthetic fibers or blends thereof. The backing can also be a stem web used alone or incorporating a nonwoven, or as a laminate with a different type of backing.

The loop fabric backing can be brushed nylon, brushed polyester, polyester stitched loop, and loop material laminated to a different type of backing material. The foam backing may be a natural sponge material or polyurethane foam and the like.

The foam backing also can be laminated to a different type of backing material. The mesh backings can be made of polymeric or metal open-weave scrims. Additionally, the backing may be a spliceless belt such as that disclosed in U.S. Pat. Nos. 5,573,619, 5,609,706, and 5,681,612 (Benedict et al.), or a reinforced thermoplastic backing that is disclosed in U.S. Pat. No. 5,417,726 (Stout et al.).

Abrasive layer 14 comprises a multiplicity of abrasive particles 16 which are bonded to a major surface of backing 12 by a first binder or make coat 18. A second binder or size coat 20 is applied over the abrasive particles and the make coat to reinforce the particles. The abrasive particles typically have an average diameter of about 0.1 to 1500 microns ($\mu$m), more preferably from about 1 to 1300 $\mu$m. Examples of useful abrasive particles include fused aluminum oxide based materials such as aluminum oxide, ceramic aluminum oxide (which may include one or more metal oxide modifiers and/or seeding or nucleating agents), and heat treated aluminum oxide, silicon carbide, co-fused alumina-zirconia, diamond, ceria, titanium diboride, cubic boron nitride, boron carbide, garnet and blends thereof. Abrasive particles also include abrasive agglomerates such as disclosed in U.S. Pat. No. 4,652,275 and U.S. Pat. No. 4,799,939, incorporated by reference herein.

The first binder is formed from a first binder precursor. The term "precursor" means the binder is uncured and not crosslinked. The term "crosslinked" means a material having polymeric sections that are interconnected through chemical bonds (that is, interchain links) to form a three-dimensional molecular network. Thus, the first precursor is in an uncured state when applied to the backing. In general, the first binder comprises a cured or crosslinked thermosetting polymer. For purposes of this application, "cured" and "polymerized" can be used interchangeably. However, with the appropriate processing conditions and catalysts, the first binder precursor is capable of crosslinking to form a thermosetting binder. For purposes of this invention, the first binder precursor is "energy-curable", "curable" or "uncured" in the sense that it can crosslink (that is, cures) upon exposure to radiation, for example, actinic radiation, electron beam radiation, and/or thermal radiation.

Additionally, under the appropriate processing conditions, the first binder precursor is a hot melt pressure sensitive adhesive. For example, depending upon the chemistry, at room temperature the first binder precursor may be a solid. For instance, the first binder precursor may be a solid film that is transfer coated to the backing. Upon heating to elevated temperature, this first binder precursor is capable of flowing, increasing the tack of the hot melt pressure sensitive adhesive. Alternatively, for instance, if the resin is solvent-borne, the first binder precursor may be liquid at room temperature.

In one embodiment of the invention, first binder precursors useful in the make coat formulations of the coated abrasive articles of the invention preferably include a hot melt pressure sensitive adhesive composition that cures upon exposure to energy to provide a covalently crosslinked, thermoset make coat. Because the first binder precursor can be applied as a hot melt composition, with the appropriate processing conditions, the first binder precursor does not readily penetrate the backing so as to compromise the backing's inherent pliability and flexibility. Consequently, the binder precursors disclosed herein are particularly advantageous when employed in conjunction with porous cloth, fabric or textile backings. However, the first binder precursor will penetrate into the backing to some degree to provide good adhesion to the backing. This degree of penetration will depend in part on the particular chemistry and processing conditions, and can be controlled.

The term "porous" as used herein in connection with backings, means a backing not having an abrasive layer, a make coat, an adhesive layer, a sealant, a saturant coat, a presize coat, a backsize coat, and so forth thereon, and which demonstrates a Gurley porosity of less than 50 seconds when measured according to Federal Test Method Std. No. 191, Method 5452 (published Dec. 31, 1968) (as referred to in the *Wellington Sears Handbook of Industrial Textiles* by E. R. Kaswell, 1963 edition, page 575) using a Gurley Permeometer (available from Teledyne Gurley, Inc., Troy, N.Y.). Cloth backings of presently known coated abrasive articles conventionally require special treatments such as a saturant coat, a presize coat, a backsize coat or a subsize coat to protect the cloth fibers and to seal the backing. The backing may be free of these treatments. Alternatively, the backing may comprise one or more of these treatments. The type of backing and backing treatment depends in part on the desired properties for the intended use. The hot melt make coats of the invention can provide such treatments.

The pressure sensitive adhesive qualities of the uncured hot melt make coat enable the abrasive particles to adhere to the uncured make coat prior to the curing process. The crosslinked, thermoset make coat is tough, yet flexible, and aggressively adheres to the backing.

The binder precursors useful in the invention include an epoxy resin that contributes to the toughness and durability of the cured make coat, a thermoplastic that allows for the uncured make coat to display pressure sensitive adhesive properties and preferably, consisting essentially of an ethylene-vinyl acetate copolymer (EVA), and a catalyst for the epoxy portion of the make coat formulation. Optionally, the binder precursors of the invention may also include a thermoplastic polyester to provide additional pressure sensitive adhesive properties and to compatibilize the EVA and epoxy resins, a hydroxyl-containing material to modify the rate of curing and/or stiffness of the make coats, a tackifier, a filler, and the like.

Preferred binder precursors of the invention contain from about 45 to about 95 weight percent epoxy resin and from about 5 to about 55 weight percent of ethylene-vinyl acetate copolymer, the weight percent being based on the total resin content. A more preferred binder precursor contains from about 70 to about 95 weight percent of epoxy resin and from about 5 to about 30 weight percent ethylene-vinyl acetate copolymer and contain no hydroxyl containing material, the weight percent being based on the total resin content.

Other preferred binder precursors of the invention contain from about 50 to about 94 weight percent epoxy resin, from about 5 to about 50 weight percent of ethylene-vinyl acetate copolymer, and from about 0.1 to about 15 weight percent of polyfunctional acrylate component, the weight percent being based on the total resin content. Other more preferred binder precursors of the invention contain from about 70 to about 92 weight percent epoxy resin, from about 5 to about 30 weight percent ethylene-vinyl acetate copolymer, and from about 3 to about 15 weight percent of a polyfunctional acrylate component, the weight percent being based on the total resin content. "Total resin content" means the sum of epoxy resin, EVA copolymer, and polyacrylate component, if present.

Epoxy Resins

Epoxy resins useful in the adhesive compositions of the invention are any organic compounds having at least one oxirane ring, that is,

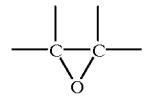

polymerizable by a ring opening reaction. Such materials, broadly called epoxides, include both monomeric and polymeric epoxides and can be aliphatic, alicyclic, heterocyclic, cycloaliphatic, or aromatic and can be combinations thereof. They can be liquid or solid or blends thereof, blends being useful in providing tacky adhesive films. These materials generally have, on the average, at least two epoxy groups per molecule and are also called "polyepoxides." The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendent epoxy groups (for example, a glycidyl methacrylate polymer or copolymer). The molecular weight of the epoxy resin may vary from about 74 to about 100,000 or more. Mixtures of various epoxy resins can also be used in the hot melt compositions of the invention. The "average" number of epoxy groups per molecule is defined as the number of epoxy groups in the epoxy resin divided by the total number of epoxy molecules present.

Useful epoxy resins include those which contain cyclohexene oxide groups such as the epoxycyclohexane carboxylates, typified by 3,4-epoxycyclohexylmethyl-3,4-epoxycyclohexane carboxylate, 3,4-epoxy-2-methylcyclohexylmethyl-3,4-epoxy-2-methylcyclohexane carboxylate, and bis(3,4-epoxy-6-methylcyclohexylmethyl) adipate. For a more detailed list of useful epoxides of this nature, reference may be made to U.S. Pat. No. 3,117,099, incorporated herein by reference.

Further epoxy resins which are particularly useful in the practice of this invention include glycidyl ether monomers of the formula:

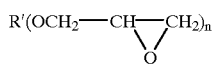

where R' is aliphatic(for example, alkyl), aromatic (for example, aryl), or combinations thereof, and n is an integer of 1 to 6. Examples are the glycidyl ethers of polyhydric phenols obtained by reacting a polyhydric phenol with an excess of chlorohydrin such as epichlorohydrin, for example, the diglycidyl ether of 2,2-bis-(4-hydroxyphenyl) propane (Bisphenol A). Further examples of epoxides of this type which can be used in the practice of this invention are described in U.S. Pat. No. 3,018,262, incorporated herein by reference. Preferred epoxy resins include the diglycidyl ethers of Bisphenol A.

There is a host of commercially available epoxy resins which can be used in this invention. In particular, epoxides which are readily available include octadecylene oxide, epichlorohydrin, styrene oxide, vinylcyclohexene oxide, glycidyl methacrylate, diglycidyl ether of Bisphenol A (for example, those available under the trade designations "EPON 828," "EPON 1004," and "EPON 1001F" from Shell Chemical Co., Houston, Tex., and "DER-332" and "DER-334," from Dow Chemical Co., Midland, Mich.), diglycidyl ether of Bisphenol F (for example, those under the trade designations "ARALDITE GY281" from Ciba-Geigy Corp., Hawthorne, N.Y., and "EPON 862" from Shell Chemical Co.), vinylcyclohexene dioxide (for example, having the trade designation "ERL 4206" from Union Carbide Corp., Danbury, Conn.), 3,4-epoxycyclohexyl-methyl-3,4-epoxycyclohexene carboxylate (for example, having the trade designation "ERL-4221" from Union Carbide Corp.), 2-(3,4-epoxycyclohexyl-5,5-spiro-3,4-epoxy) cyclohexane-metadioxane (for example, having the trade designation "ERL-4234" from Union Carbide Corp.), bis(3,4-epoxycyclohexyl) adipate (for example, having the trade designation "ERL-4299" from Union Carbide Corp.), dipentene dioxide (for example, having the trade designation "ERL-4269" from Union Carbide Corp.), epoxidized polybutadiene (for example, having the trade designation "OXIRON 2001" from FMC Corp.), epoxy silanes, for example, beta-3,4-epoxycyclohexylethyltrimethoxysilane and gamma-glycidoxypropyltrimethoxysilane, commercially available from Union Carbide, flame retardant epoxy resins (for example, having the trade designation "DER-542," a brominated bisphenol type epoxy resin available from Dow Chemical Co.), 1,4-butanediol diglycidyl ether (for example, having the trade designation "ARALDITE RD-2" from Ciba-Geigy Corp.), hydrogenated bisphenol A-epichlorohydrin based epoxy resins (for example having the trade designation "EPONEX 1510" from Shell Chemical Co.), and polyglycidyl ethers of phenol-formaldehyde novolaks (for example, having the trade designation "DEN-431" and "DEN-438" from Dow Chemical Co.).

Ethylene Vinyl Acetate Copolymer

The thermoplastic component of the binder precursors and make resins of the invention includes and preferably, consists essentially of one or more thermoplastic ethylene-vinyl acetate copolymer resins. Ethylene vinyl acetate ("EVA") copolymers are well known, and may be prepared by high pressure free radical copolymerization of vinyl acetate and ethylene as is known in the art. Useful EVA copolymers include those having a vinyl acetate moiety content of not less than about 30%, generally, not less than about 40%, preferably, not less than about 50%, and even more preferably, not less than about 60% by weight of the copolymer. Useful EVA copolymers also include those having a vinyl acetate content in the range of from about 20 to about 99%, preferably, from about 40 to about 95%, more preferably from about 50 to about 90%, and even more preferably from about 60 to about 80% by weight of the copolymer.

There are many commercial sources for EVA copolymers such as, for example, E. I. Du Pont de Nemours and Co. (Wilmington, De.) under the trade designation "ELVAX", Bayer Corp. (Pittsburgh, Pa.) under the trade designation "LEVAPREN", and AT Plastics, Inc. (Ontario, Canada).

Non-limiting examples of commercially available EVA copolymers that may be used in practice of the present invention include AT Plastics 3325M EVA copolymer (33 weight percent vinyl acetate); ELVAX™ 40W and LEVAPREN™ 400 (40 weight percent vinyl acetate); LEVAPREN™ 450, 452 and 456 (45 weight percent vinyl acetate); LEVAPREN™ 500HV (50 weight percent vinyl acetate); LEVAPREN™ 600 HV (60 weight percent vinyl acetate); and LEVAPREN™ 700 HV (70 weight percent vinyl acetate).

The components used to form the binder precursor compositions of the invention that contain epoxy resin and EVA are compatible in the molten state. "Compatible" means that the molten mixture of at least the epoxy resin and the thermoplastic components is single phased, that is, does not visibly phase separate among the individual components and forms a homogeneous mixture of molten components. Of course, one skilled in the art can easily vary the concentrations of the epoxy resins, EVA copolymers and vinyl acetate content therein, and catalysts to form homogeneous compositions of the invention without undue experimentation. For example, one skilled in the art would generally increase the vinyl acetate concentration of the EVA copolymer as the concentration of epoxy resin in the uncured composition increases so to maintain a singled phased composition in the molten state.

The specific physical properties of the cured binder containing epoxy resin and EVA may also be tailored to suit the specific application by adjusting the ratio of the preceding components. Generally, increased tack and adhesion to high energy surfaces, and a decreased tendency to flow during cure is achieved by increasing the relative amount of EVA copolymer in the formulation. Additionally, tack of the composition may be affected by the amount of plasticization of the EVA copolymer by a liquid epoxy resin. The amount of photocatalyst is selected to optimize cure speed and uniformity of through cure. Thus, the relative amounts of the above-mentioned ingredients are balanced depending on the properties sought in the final composition.

Polyfunctional Acrylate

A "polyfunctional acrylate" component of one embodiment of the binder precursor compositions of the invention means ester compounds which are the reaction product of aliphatic polyhydroxy compounds and (meth)acrylic acids. The aliphatic polyhydroxy compounds include compounds such as (poly)alkylene glycols and (poly)glycerols.

(Meth)acrylic acids are unsaturated carboxylic acids which include, for example, those represented by the following basic formula:

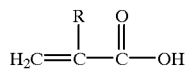

where R is a hydrogen atom or a methyl group.

Polyfunctional acrylates can be a monomer or an oligomer. For purposes of this invention, the term "monomer" means a small (low-molecular-weight) molecule with an inherent capability of forming chemical bonds with the same or other monomers in such manner that long chains (polymeric chains or macromolecules) are formed. For this application, the term "oligomer" means a polymer molecule having 2 to 10 repeating units (for example, dimer, trimer, tetramer, and so forth) having an inherent capability of forming chemical bonds with the same or other oligomers in such manner that longer polymeric chains can be formed therefrom. Mixtures of monomers and oligomers also could be used as the polyfunctional acrylate component. It is preferred that the polyfunctional acrylate component be monomeric.

Representative polyfunctional acrylate monomers include, by way of example and not limitation: ethylene glycol diacrylate, ethylene glycol dimethacrylate, hexanediol diacrylate, triethylene glycol diacrylate, trimethylolpropane triacrylate, ethoxylated trimethylolpropane triacrylate, glycerol triacrylate, pentaerthyitol triacrylate, pentaerythritol trimethacrylate, pentaerythritol tetraacrylate, pentaerythritol tetramethacrylate, and neopentylglycol diacrylate. Mixtures and combinations of different types of such polyfunctional acrylates also can be used. The term "acrylate", as used herein, encompasses acrylates and methacrylates.

Useful commercially available polyfunctional acrylates include trimethylolpropane triacrylate having the trade designation "SR351," ethoxylated trimethylolpropane triacrylate having the trade designation "SR454," pentaerythritol tetraacrylate having the trade designation "SR295," and neopentylglycol diacrylate having the trade designation "SR247," all available from Sartomer Co., Exton, Pa.

The polyfunctional acrylate monomers cure quickly into a network due to the multiple functionalities available on each monomer. If there is only one acrylate functionality, a linear, non-networked molecule will result upon cure of the material. Polyfunctional acrylates having a functionality of two or more are preferred in this invention to encourage and promote the desired polymeric network formation.

Useful polyfunctional acrylate oligomers include commercially available polyether oligomers such as polyethylene glycol 200 diacrylate having the trade designation "SR259" and polyethylene glycol 400 diacrylate having the trade designation "SR344," both available from Sartomer Co., Exton, Pa.

Other oligomers include acrylated epoxys such as diacrylated esters of epoxy resins, for example, diacrylated esters of bisphenol A epoxy resin. Examples of commercially available acrylated epoxys include epoxies available under the trade designations "EBECRYL3500," "EBECRYL3600," and "EBECRYL 3700," from UCB Chemicals Corp., Smyrna, Ga.

In general, the optimal amount of the polyfunctional acrylate used in the binder precursor composition is proportional to the acrylate equivalent weight and inversely proportional to the acrylate functionality.

Binder precursor compositions based on epoxy and ethylene-vinyl acetate copolymer which also contain the polyfunctional acrylates are also higher in viscosity after exposure to UV radiation. This feature allows for a fine-tuning of the relative rates of epoxy cure and resin flow allowing for control of the degree of abrasive particle wetting and orientation. As general formulation guidelines, with too little polyfunctional acrylate, the binder precursor can flow too readily, wetting the abrasive particles so well that the abrasive particles are buried below the surface of the coating, particularly with thicker coatings.

With too much polyfunctional acrylate, the binder precursor cannot flow sufficiently to wet the abrasive particles before the epoxy component is fully cured. In this case, even though the uncured binder resin is aggressively tacky at room temperature, abrasive particle adhesion is poor because wetting is precluded by the rheology of the post-irradiated resin. On the other hand, increasing amounts of the epoxy resin relative to the ethylene-vinyl acetate component and polyfunctional acrylate component tends to result in stiffer cured binders. Thus, the relative amounts of these three ingredients are balanced depending on the properties sought in the final binder.

Catalysts

Catalysts of the present invention preferably can be activated by photochemical means, such as by actinic radiation (radiation having a wavelength in the ultraviolet or visible portion of the electromagnetic spectrum). Useful photocatalysts are of two general types: onium salts and cationic organometallic salts, both described in U.S. Pat. No. 5,709,948, incorporated herein by reference.

Onium salt photoinitiators for cationic polymerizations include iodonium and sulfonium complex salts. Useful aromatic iodonium complex salts are of the general formula:

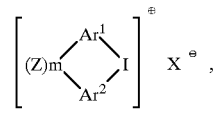

wherein

Ar$^1$ and Ar$^2$ can be the same or different and are aromatic groups having from 4 to about 20 carbon atoms, and are selected from the group consisting of phenyl, thienyl, furanyl, and pyrazolyl groups;

Z is selected from the group consisting of oxygen, sulfur, nitrogen, a carbon-carbon bond,

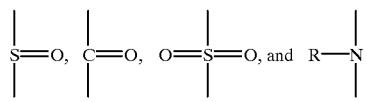

wherein R can be aryl (having from 6 to about 20 carbon atoms, such as phenyl) or acyl (having from 2 to about 20 carbon atoms, such as acetyl, or benzoyl), and

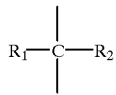

wherein $R_1$ and $R_2$ are selected from the group consisting of hydrogen, alkyl radicals having from 1 to about 4 carbon atoms, and alkenyl radicals having from 2 to about 4 carbon atoms;
m is zero or 1; and
X has the formula $DQ_n$, wherein D is a metal from Groups IB to VIII or a metalloid from Groups IIIA to VA of the Periodic Chart of the Elements (Chemical Abstracts version), Q is a halogen atom, and n is an integer having a value of from 1 to 6. Preferably, the metals are copper, zinc, titanium, vanadium, chromium, magnesium, manganese, iron, cobalt, or nickel and the metalloids preferably are boron, aluminum, antimony, tin, arsenic and phosphorous. Preferably, the halogen, Q, is chlorine or fluorine. Illustrative of suitable anions are $BF_4^-$, $PF_6^-$, $SbF_6^-$, $FeCl_4^-$, $SnCl_5^-$, $AsF_6^-$, $SbF_5OH^-$, $SbCl_6^-$, $SbF_5^{-2}$, $AlF_5^{-2}$, $GaCl_4^-$, $InF_4^-$, $TiF_6^{-2}$, $ZrF_6^{-2}$, $CF_3SO_3^-$ and the like. Preferably, the anions are $BF_4^-$, $PF_6^-$, $SbF_6^-$, $AsF_6^-$, $SbF_5OH$, and $SbCl_6^-$. More preferably, the anions are $SbF_6^-$, $AsF_6^-$, and $SbF_5OH^-$.

The $Ar_1$ and $Ar_2$ aromatic groups may optionally comprise one or more fused benzo rings (for example, naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 4,256,828, which is incorporated herein by reference. The preferred aromatic iodonium complex salts are $(Ar)_2I\ PF_6$ and $(Ar)_2I\ SbF_6$.

The aromatic iodonium complex salts useful in the invention are photosensitive only in the ultraviolet region of the spectrum. However, they can be sensitized to the near ultraviolet and the visible range of the spectrum by sensitizers for known photolyzable organic halogen compounds. Illustrative sensitizers include aromatic amines and colored aromatic polycyclic hydrocarbons, as described in U.S. Pat. No. 4,250,053, incorporated herein by reference.

Aromatic sulfonium complex salt initiators suitable for use in the invention are of the general formula

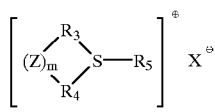

wherein
$R_3$, $R_4$ and $R_5$ can be the same or different, provided that at least one of the groups is aromatic. These groups can be selected from the group consisting of aromatic moieties having from 4 to about 20 carbon atoms (for example, substituted and unsubstituted phenyl, thienyl, and furanyl) and alkyl radicals having from 1 to about 20 carbon atoms. The term "alkyl" includes substituted alkyl radicals (for example, substituents such as halogen, hydroxy, alkoxy, and aryl). Preferably, $R_3$, $R_4$ and $R_5$ are each aromatic; and Z, m and X are all as defined above with regard to the iodonium complex salts.

If $R_3$, $R_4$ or $R_5$ is an aromatic group, it may optionally have one or more fused benzo rings (for example, naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Triaryl-substituted salts such as triphenylsulfonium hexafluoroantimonate and p-(phenyl(thiophenyl) diphenylsulfonium hexafluoroantimonate are the preferred sulfonium salts. Useful sulfonium salts are described more fully in U.S. Pat. No. 5,256,828.

Aromatic sulfonium complex salts useful in the invention are photosensitive only in the ultraviolet region of the spectrum. However, they can be sensitized to the near ultraviolet and the visible range of the spectrum by a select group of sensitizers such as described in U.S. Pat. Nos. 4,256,828 and 4,250,053.

Suitable photoactivatable organometallic complex salts useful in the invention include those described in U.S. Pat. Nos. 5,059,701, 5,191,101, and 5,252,694, each of which is incorporated herein by reference. Such salts of organometallic cations have the general formula:

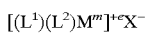

wherein $M^m$ represents a metal atom selected from elements of periodic groups IVB, VB, VIB, VIIB and VIII, preferably Cr, Mo, W, Mn, Re, Fe, and Co;

$L^1$ represents none, one, or two ligands contributing π-electrons that can be the same or different ligand selected from the group consisting of substituted and unsubstituted alicyclic and cyclic unsaturated compounds and groups and substituted and unsubstituted carbocyclic aromatic and heterocyclic aromatic compounds, each capable of contributing two to twelve π-electrons to the valence shell of the metal atom M. Preferably, $L^1$ is selected from the group consisting of substituted and unsubstituted $\eta^3$-allyl, $\eta^5$-cyclopentadienyl, $\eta^7$-cycloheptatrienyl compounds, and $\eta^6$-aromatic compounds selected from the group consisting of $\eta^6$-benzene and substituted $\eta^6$-benzene compounds (for example, xylenes) and compounds having 2 to 4 fused rings, each capable of contributing 3 to 8 π-electrons to the valence shell of $M^m$;

$L^2$ represents none or 1 to 3 ligands contributing an even number of π-electrons that can be the same or different ligand selected from the group consisting of carbon monoxide, nitrosonium, triphenyl phosphine, triphenyl stibine and derivatives of phosphorous, arsenic and antimony, with the proviso that the total electronic charge contributed to $M^m$ by $L^1$ and $L^2$ results in a net residual positive charge of e to the complex; and e is an integer having a value of 1 or 2, the residual charge of the complex cation;

X is a halogen-containing complex anion, as described above.

Examples of suitable salts of organometallic complex cations useful as photoactivatable catalysts in the present invention include:

($\eta^6$-benzene)($\eta^5$-cyclopentadienyl)Fe$^{+1}$ SbF$_6^-$
($\eta^6$-toluene)($\eta^5$-cyclopentadienyl)Fe$^{+1}$ AsF$_6^-$
($\eta^6$-xylene)($\eta^5$-cyclopentadienyl)Fe$^{+1}$ SbF$_6^-$
($\eta^6$-cumene)($\eta^5$-cyclopentadienyl)Fe$^{+1}$ PF$_6^-$
($\eta^6$-xylenes (mixed isomers))($\eta^5$-cyclopentadienyl)Fe$^{+1}$ SbF$_6^-$
($\eta^6$-xylenes (mixed isomers))($\eta^5$-cyclopentadienyl)Fe$^{+1}$ PF$_6^-$
($\eta^6$-o-xylene)($\eta^5$-cyclopentadienyl)Fe$^{+1}$ CF$_3$SO$_3^-$
($\eta^6$-m-xylene)($\eta^5$-cyclopentadienyl)Fe$^{+1}$ BF$_4^-$
($\eta^6$-mesitylene)($\eta^5$-cyclopentadienyl)Fe$^{+1}$ SbF$_6^-$
($\eta^6$-hexamethylbenzene)($\eta^5$-cyclopentadienyl)Fe$^{+1}$ SbF$_5$OH$^-$ and
($\eta^6$-fluorene)($\eta^5$-cyclopentadienyl)Fe$^{+1}$ SbF$_6^-$.

Preferred salts of organometallic complex cations useful in the invention include one or more of the following: ($\eta^6$-xylenes (mixed isomers)) ($\eta^5$-cyclopentadienyl)Fe$^{+1}$ SbF$_6^-$, ($\eta^6$-xylenes (mixed isomers))($\eta^5$-cyclopentadienyl)Fe$^{+1}$ PF$_6^-$, ($\eta^6$-xylene)($\eta^5$-cyclopentadienyl)Fe$^{+1}$ SbF$_6^-$, and ($\eta^6$-mesitylene)($\eta^5$-cyclopentadienyl)Fe$^{+1}$ SbF$_6^-$.

Useful commercially available initiators include FX-512™ (Minnesota Mining and Manufacturing Company, St. Paul, Minn.), CD-1010™ and CD-1012™ (Sartomer, Exton, Pa.) aromatic sulfonium complex salts, UVI™-6974, an aromatic sulfonium complex salt (Union Carbide Corp., Danbury, Conn.) and IRGACURE™ 261, a cationic organometallic complex salt (Ciba Geigy Chemicals, Hawthorne, N.Y.).

Preferably, the photocatalyst of the invention if employed comprises from about 0.01 to about 10 weight percent, more preferably 0.1 to about 5 weight percent, still more preferably from about 0.5 to about 2 weight percent of a photocatalyst based on the total weight of the resin present in the composition.

Where the catalytic photoinitiator used for curing the epoxy resin is a metallocene salt catalyst, it preferably is accompanied by an accelerator such as an oxalate ester of a tertiary alcohol as described in U.S. Pat. No. 5,436,063, although this is optional. Oxalate co-catalysts that can be used include those described in U.S. Pat. No. 5,252,694. The accelerator preferably comprises from about 0.1 to about 4% of the binder composition based on the combined weight of the epoxy resin, and the ethylene-vinyl acetate copolymer.

Although the preferred curing agent for epoxy resins is a cationic photocatalyst, certain thermally-activated curing agents for epoxy resins (for example, compounds that effect curing and crosslinking of the epoxide by entering into a chemical reaction therewith) are useful in the present invention. Preferably, such curing agents are thermally stable at temperatures at which mixing of the components takes place.

Suitable thermal curing agents include aliphatic and aromatic primary and secondary amines, for example, di(4-aminophenyl)sulfone, di(4-aminophenyl)ether, and 2,2-bis-(4-aminophenyl)propane; aliphatic and aromatic tertiary amines, for example, dimethylaminopropylamine; fluorene diamines, such as those described in U.S. Pat. No. 4,684,678, incorporated herein by reference; boron trifluoride complexes such as BF$_3$Et$_2$O and BF$_3$H$_2$NC$_2$H$_4$OH; imidazoles, such as methylimidazole; hydrazines, such as adipohydrazine; and guanidines, such as tetramethylguanidine and dicyandiamide (cyanoguanidine, also commonly known as DiCy), and mixtures thereof.

Useful commercially available thermal curing agents include AMICURE™ CG-1200, dicyandiamide (Air Products and Chemicals, Allentown, Pa.), and CUREZOL™ 2MZ-AZINE, 2,4-diamino-6(2'methylimidazoleyl-(1')) ethyl-s-triazine (Air Products and Chemicals).

Preferably, the thermal curative of the invention comprises from about 1 to 25 weight percent, more preferably from about 2 to about 20 weight percent, and still more preferably from about 3 to about 15 weight percent of one or more thermal catalysts, the weight percent being based on the combined weight of the epoxy resin, ethylene-vinyl acetate component, and the polyfunctional acrylate component, if present.

In the case of the free radical curable polyfunctional acrylate component, it is useful to add a free radical initiator to the make coat precursor, although it should be understood that an electron beam source also could be used to initiate and generate free radicals. The free radical initiator preferably is added in an amount of 0.1 to 3.0% by weight, based on the total amount of resinous components.

Examples of useful photoinitiators, that generate a free radical source when exposed to ultraviolet light, include, but are not limited to, organic peroxides, azo compounds, quinones, benzophenones, nitroso compounds, acyl halides, hydrazones, mercapto compounds, pyrylium compounds, triacylimidazoles, acylphosphine oxides, bisimidazoles, chloroalkyltriazines, benzoin ethers, benzil ketals, thioxanthones, and acetophenone derivatives, and mixtures thereof.

Examples of photoinitiators that generate a source of free radicals when exposed to visible radiation, are described in U.S. Pat. No. 4,735,632, which description is incorporated herein by reference. A preferred free radical-generating initiator for use with ultraviolet light is an initiator commercially available from Ciba Specialty Chemicals under the trade designation "IRGACURE 651".

Examples of useful thermal initiators, that generate a free radical source when exposed to thermal energy, include azo, peroxide, persulfate, and redox initiators.

Suitable azo initiators include, but are not limited to 2,2'-azobis(4-methoxy-2,4-dimethylvaleronitrile)(VAZO 33); 2,2'-azobis(2-amidinopropane)dihydrochloride ((VAZO 50); 2,2'-azobis(2,4-dimethylvaleronitrile)(VAZO 52); 2,2'-azobis(isobutyronitrile)(VAZO 64); 2,2'-azobis-2-methylbutyronitrile (VAZO 67); 1,1'-azobis(1-cyclohexanecarbonitrile)(VAZO 88), all of which are available from DuPont Chemicals and 2,2'-azobis(methyl isobutyrate)(V-601), available from Wako Chemicals.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (PERKADOX 16S, available from Akzo Chemicals, Inc., di(2-ethylhexyl) peroxydicarbonate, t-butylperoxypivalate (Lupersol 11, available from Atochem), t-butylperoxy-2-ethylhexanoate (Trigonox 21-C50, available from Akzo Chemicals, Inc.), and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based on organic peroxides and tertiary amines, for example, benzoyl peroxide plus dimethylaniline; and systems based on organic hydroperoxides and transition metals, for example, cumene hydroperoxide plus cobalt naphthenate.

Other initiators include, but are not limited to pinacols, such as tetraphenyl 1,1,2,2-ethanediol.

Preferred thermal free-radical initiators are selected from the group consisting of azo compounds and peroxides. Most preferred are V-601, Lupersol 11 and Perkadox 16S, and mixtures thereof.

The initiator is present in a catalytically-effective amount and such amounts are typically in the range of about 0.01 parts to 5 parts, and more preferably in the range from about 0.025 to 2 parts by weight, based upon 100 total parts by weight of the total binder composition. If a mixture of initiators is used, the total amount of the mixture of initiators would be as if a single initiator was used.

Thermoplastic Polyesters

Optionally, the binder precursors of the invention may further comprise a thermoplastic polyester. Useful polyester components include both hydroxyl and carboxyl terminated materials, which may be amorphous or semicrystalline, of which the hydroxyl terminated materials are more preferred. By "amorphous" is meant a material that displays a glass transition temperature but does not display a measurable crystalline melting point by differential scanning calorimetry (DSC). Preferably the glass transition temperature is less than the decomposition temperature of the initiator (discussed below), but without being more than about 120° C. By "semicrystalline" is meant a polyester component that displays a crystalline melting point by DSC, preferably with a maximum melting point of about 150° C.

The viscosity of the polyester component is important in providing a hot melt binder precursor composition (as opposed to a resin composition which is a liquid having a measurable viscosity at room temperature). Accordingly, polyester components useful in the binder precursor compositions of the invention preferably have a Brookfield viscosity which exceeds 10,000 millipoise at 121° C. as measured on a Brookfield Viscometer Model # DV-II employing spindle #27 with a thermocel attachment. Viscosity is related to the molecular weight of the polyester component. Preferred polyester components also have a number average molecular weight of about 7500 to 200,000, more preferably from about 10,000 to 50,000 and most preferably from about 20,000 to 40,000.

Polyester components useful in the binder precursor compositions of the invention comprise the reaction product of dicarboxylic acids (or their diester derivatives) and diols. The diacids (or their diester derivatives) can be saturated aliphatic acids containing from 4 to 12 carbon atoms (including unbranched, branched, or cyclic materials having 5 to 6 atoms in a ring) and/or aromatic acids containing from 8 to 15 carbon atoms. More specific examples of suitable polyester components and polyester materials are described in U.S. Pat. No. 5,436,063, incorporated herein by reference.

The components used to form the binder precursor compositions of the invention (exclusive of additives described below) are compatible in the molten state. "Compatible" means that the molten mixture of components is single phased, that is, does not visibly phase separate among the individual components and forms a homogeneous mixture of molten components. Of course, one skilled in the art can easily vary the concentrations of the epoxy resins, EVA copolymers and vinyl acetate content therein, optional thermoplastic polyester, and catalysts to form binder precursor compositions of the invention without undue experimentation. For example, one skilled in the art would generally increase the vinyl acetate concentration of the EVA copolymer as the concentration of epoxy resin in the composition increases so to maintain a single phased composition in the molten state.

The specific physical properties which may be tailored to suit the specific application by adjusting the ratio of the preceding components. Generally, increased tack and adhesion to high energy surfaces, and a decreased tendency to flow during cure is achieved by increasing the relative amount of ethylene-vinyl acetate copolymer in the composition. Increasing the relative amount of polyester in the binder composition generally reduces tack, increases flow, and enhances compatibility of the epoxy and ethylene-vinyl acetate copolymer components. The amount of catalyst is selected to optimize cure speed, uncured product life, and uniformity of through cure. Thus, the relative amounts of the above mentioned ingredients are balanced depending on the properties sought in the final cured binder.

Hydroxyl Containing Material

Optionally, the binder precursors of the invention may further comprise a hydroxyl-containing material. The hydroxyl-containing material may be any liquid or solid organic material having hydroxyl functionality of at least 1, preferably at least 2. The hydroxyl-containing organic material should be free of other "active hydrogen" containing groups such as amino and mercapto moieties. The hydroxyl-containing organic material should also preferably be devoid of groups which may be thermally or photochemically unstable so that the material will not decompose or liberate volatile components at temperatures below about 100° C. or when exposed to an energy source during curing.

Preferably the organic material contains two or more primary or secondary aliphatic hydroxyl groups (that is, the hydroxyl group is bonded directly to a non-aromatic carbon atom). The hydroxyl group may be terminally situated, or may be pendant from a polymer or copolymer. The number average equivalent weight of the hydroxyl-containing material is preferably about 31 to 2250, more preferably about 80 to 1000, and most preferably about 80 to 350. More preferably, polyoxyalkylene glycols and triols are used as the hydroxyl-containing material. Even more preferably, cyclohexane dimethanol is used as the hydroxyl-containing material.

Representative examples of suitable organic materials having a hydroxyl functionality of 1 include alkanols, monoalkyl ethers of polyoxyalkylene glycols, and monoalkyl ethers of alkylene glycols.

Representative examples of useful monomeric polyhydroxy organic materials include alkylene glycols (for example, 1,2-ethanediol, 1,3-propanediol, 1,4-butanediol, 2-ethyl-1,6-hexanediol, 1,4-cyclohexane dimethanol, 1,18-dihydroxyoctadecane, and 3-chloro-1,2-propanediol), polyhydroxyalkanes (for example, glycerine, trimethylolethane, pentaerythritol, and sorbitol) and other polyhydroxy compounds such as N,N-bis(hydroxyethyl)benzamide, castor oil, and the like.

Representative examples of useful polymeric hydroxyl-containing materials include polyoxyalkylene polyols (for example, polyoxyethylene and polyoxypropylene glycols and triols of equivalent weight of 31 to 2250 for the diols or 80 to 350 for triols), polytetra-methylene oxide glycols of varying molecular weight, hydroxyl-terminated polyesters, and hydroxyl-terminated polylactones.

Useful commercially available hydroxyl-containing materials include those described in U.S. Pat. No. 5,436,063, incorporated herein by reference.

The amount of hydroxyl-containing organic material used in the binder precursors of the invention may vary over a broad range, depending on factors such as the compatibility of the hydroxyl-containing material with both the epoxy resin and the polyester component, the equivalent weight and functionality of the hydroxyl-containing material, and the physical properties desired in the final cured make coat.

The optional hydroxyl-containing material is particularly useful in tailoring the glass transition temperature and flexibility of the hot melt make coats of the invention. As the equivalent weight of the hydroxyl-containing material increases, the flexibility of the hot melt make coat correspondingly increases although there may be a consequent loss in cohesive strength. Similarly, decreasing equivalent weight may result in a loss of flexibility with a consequent increase in cohesive strength. Thus, the equivalent weight of the hydroxyl-containing material is selected so as to balance these two properties.

As explained more fully hereinbelow, the incorporation of polyether polyols into the binder precursors of the invention is especially desirable for adjusting the rate at which the binder precursors cure upon exposure to energy. Useful polyether polyols (that is, polyoxyalkylene polyols) for adjusting the rate of cure include polyoxyethylene and polyoxypropylene glycols and triols having an equivalent weight of about 31 to 2250 for the diols and about 80 to 350 for the triols, as well as polytetramethylene oxide glycols of varying molecular weight and polyoxyalkylated bisphenol A's.

The relative amount of the optional hydroxyl-containing organic material is determined with reference to the ratio of the number of hydroxyl groups to the number of epoxy groups in the binder precursor composition. That ratio may range from 0:1 to 1:1, more preferably from about 0.4:1 to 0.8:1. Larger amounts of the hydroxyl-containing material increase the flexibility of the binder precursor but with a consequent loss of cohesive strength. If the hydroxyl containing material is a polyether polyol, increasing amounts will further slow the curing process.

Tackifiers

To improve the tack, a tackifier may be incorporated into the binder precursor composition. This tackifier may be a rosin ester, an aromatic resin, or mixtures thereof or any other suitable tackifier. Representative examples of rosin ester tackifiers which are useful in the present invention include glycerol rosin ester, pentaerythritol rosin ester, and hydrogenated versions of the above. Representative examples of aromatic resin tackifiers include alphamethyl styrene resin, styrene monomer, polystyrene, coumarone, indene, and vinyl toluene. Preferably, the tackifier is a hydrogenated rosin ester.

Useful tackifier resin types include rosin and rosin derivatives obtained from pine trees and organic acids of abietic and pimaric type which can be esterified, hydrogenated or polymerized (MW to 2,000), and are commercially available from Hercules Chemical under the trade designation "FORALS" or from Arizona Chemical Co. as "SYLVATAC"; terpene resins obtained from turpentine and citrus peels as alpha & beta-pinene or limonene which can be cationically polymerized (MW. 300 to 2,000) or can be modified with C-9 monomers(terpene phenolic), and are commercially available from Hercules Chemical under trade designation "PICCOLYTE" or from Arizona Chemical Co. under the trade designation "ZONATAC"; or certain aliphatic hydrocarbon resins such as aliphatic resins based on C-5 monomers (for example, piperylene and dicyclopentadiene) commercially available from Goodyear Chemicals under the trade designation "WINGTACK"; aromatic resins based on C-9 monomers (for example, indene or styrene) commercially available from Hercules Chemical under the trade designation "REGALREZ" or commercially available from Exxon Chemical under the trade designation "ESCOREZ 2000", which can be hydrogenated (MW 300-1200).

If a tackifier is used in the first binder precursor, it may be present in an amount of 0.1 to 40 parts by weight, preferably 0.5 to 20 parts by weight, based on the total weight of the first binder precursor.

Size coat 20 is applied over abrasive particles 16 and make coat 18. The size coat may comprise a glue or a cured resinous adhesive. Examples of suitable resinous adhesives include phenolic, aminoplast resins having pendant alpha, beta-unsaturated groups, urethane, acrylated urethane, epoxy, acrylated epoxy, isocyanurate, acrylated isocyanurate, urea-formaldehyde, melamine formaldehyde, bis-maleimide and fluorene-modified epoxy resins as well as mixtures thereof. Precursors for the size coat may further include catalysts and/or curing agents to initiate and/or accelerate the curing process described hereinbelow. The size coat is selected based on the desired characteristics of the finished coated abrasive article.

Additives and Fillers

Both the make and size coat binder precursors may additionally comprise various optional additives such as fillers, grinding aids, fibers, lubricants, wetting agents, surfactants, pigments, antifoaming agents, dyes, coupling agents, plasticizers and suspending agents so long as they do not adversely affect the pressure sensitive adhesive properties of the make coat (before it fully cures) or detrimentally affect the ability of the make or size coats to cure upon exposure to energy. Additionally, the incorporation of these additives, and the amount of these additives should not adversely affect the rheology of the binder precursors. For example, the addition of too much filler can adversely affect processability of the make coat.

Fillers of this invention must not interfere with the adequate curing of the resin system in which it is contained. Examples of useful fillers for this invention include silica such as quartz, glass beads, glass bubbles and glass fibers; silicates such as talc, clays, (montmorillonite) feldspar, mica, calcium silicate, calcium metasilicate, sodium aluminosilicate, sodium silicate; metal sulfates such as calcium sulfate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite. Preferred fillers are feldspar and quartz.

If a grinding aid is employed in the practice of the present invention, suitable grinding aids include cryolite, chiolite, ammonium cryolite, potassium tetrafluoroborate, and the like.

Abrasive layer 14 may further comprise a third binder or supersize coating 22. One type of useful supersize coating includes a grinding aid, such as potassium tetrafluoroborate, and an adhesive, such as an epoxy resin. This type of supersize coating is further described in published European Patent application 486,308, which is incorporated herein by reference. Supersize coating 22 may be included to prevent or reduce the accumulation of swarf (the material abraded from a workpiece) between abrasive particles which can dramatically reduce the cutting ability of the abrasive article. Materials useful in preventing swarf accumulation include metal salts of fatty acids (for example, zinc stearate or calcium stearate), salts of phosphate esters (for example, potassium behenyl phosphate), phosphate esters, urea-formaldehyde resins, mineral oils, crosslinked silanes, crosslinked silicones, fluorochemicals and combinations thereof.

An optional back size coating 24, such as an antislip layer, comprising a resinous adhesive having filler particles dispersed therein can be provided. Alternatively, the backsize coating may be a pressure sensitive adhesive for bonding the coated abrasive article to a support pad may be provided on backing 12. Examples of suitable pressure sensitive adhesives include latex, crepe, rosin, acrylate polymers (for example, polybutyl acrylate and polyacrylate esters), acrylate copolymers (for example, isooctylacrylate/ acrylic acid), vinyl ethers (for example, polyvinyl n-butyl ether), alkyd adhesives, rubber adhesives (for example, natural rubbers, synthetic rubbers and chlorinated rubbers), and mixtures thereof. An example of a pressure sensitive adhesive coating is described in U.S. Pat. No. 5,520,957, incorporated herein by reference.

The back size coating may also contain an electrically conductive material such as vanadium pentoxide (in, for example, a sulfonated polyester), or carbon black or graphite in a binder. Examples of useful conductive back size coatings are disclosed in U.S. Pat. No. 5,108,463 and U.S. Pat. No. 5,137,452, both of which are incorporated herein by reference.

In order to promote the adhesion of make coat 18 and/or back size coating 24 (if included), it may be necessary to modify the surface to which these layers are applied. For example, if a polymeric film is used as the backing, it may be preferred to modify the surface of, that is, "prime", the film. Appropriate surface modifications include corona discharge, ultraviolet light exposure, electron beam exposure, flame discharge and scuffing.

Methods of Making

The following section will describe exemplary means on how to make the abrasive articles of the invention, especially with respect to manners of forming the abrasive surface thereof.

The first binder precursor may be prepared by mixing the various ingredients in a suitable vessel at an elevated temperature sufficient to liquify the materials so that they may be efficiently mixed with stirring but without thermally degrading them until the components are thoroughly melt blended. This temperature depends in part upon the particular chemistry. For example, this temperature may range from about 30 to 150° C., typically 50 to 130° C., and preferably ranges from 60 to 120° C. The components may be added simultaneously or sequentially, although it is preferred to first blend the ethylene-vinyl acetate copolymer and the solid epoxy resin, in order, followed by the addition of the liquid epoxy resin, a polyfunctional acrylate component (if present) and any optional hydroxyl-containing material. Then, the catalysts (photoinitiator, photocatalyst, and /or thermal catalyst) are added followed by any optional additives including fillers or grinding aids.

The binder precursor should be compatible in the uncured, melt phase. That is, there should preferably be no visible gross phase separation among the components before curing is initiated. The binder precursor may be used directly after melt blending or may be packaged in pails, drums or other suitable containers, preferably in the absence of light, until ready for use. The binder precursor so packaged may be delivered to a hot-melt applicator system with the use of pail unloaders and the like. Alternatively, the uncured binder precursors of the invention may be delivered to conventional bulk hot melt applicator and dispenser systems in the form of sticks, pellets, slugs, blocks, pillows or billets. It is also feasible to incorporate organic solvent into the binder precursor; although this may not always be preferred.

It is also possible to provide the first binder precursors of the invention as uncured, unsupported rolls of tacky, pressure sensitive adhesive film. In this instance, the binder precursor is extruded, cast, or coated to form the film. Such films are useful in transfer coating the first binder precursor to an abrasive article backing. It is desirable to roll up the tacky film with a release liner (for example, silicone-coated Kraft paper), with subsequent packaging in a bag or other container that is not transparent to actinic radiation.

The first binder precursors of the invention may be applied to the abrasive article backing by extrusion, gravure printing, coating, (for example, by using a coating die, a heated knife blade coater, a roll coater, a curtain coater, or a reverse roll coater), or transfer coater. When applying by any of these methods, it is preferred that the make coat be applied at a temperature of about 50 to 125° C., more preferably from about 80 to 125° C.

The binder precursors of the invention can be supplied as free standing, unsupported pressure sensitive adhesive films that can be transfer coated to the backing and, if necessary, die cut to a predefined shape before transfer coating. Transfer coating temperatures and pressures are selected so as to minimize both degradation of the backing and bleed through of the make coat and may range from room temperature to about 120° C. and about 30 to 250 psi (2.1 to 17.8 kg/cm$^2$). A typical profile is to transfer coat at room temperature and 100 psi (7.0 kg/cm$^2$). Transfer coating is a particularly preferred application method for use with highly porous backings.

It is also within the scope of this invention to coat the make coat or binder precursor as a liquid, as from a solvent, although this method is not preferred. A liquid binder precursor can be applied to the backing by any conventional technique such as roll coating, spray coating, die coating, knife coating, and the like. After coating the resulting uncured make coat, it may be exposed to an energy source to activate the catalyst before the abrasive grains are embedded into the make coat. Alternatively, the abrasive grains may be coated immediately after the make coat binder precursor is coated before partial cure is effected.

The coating weight of the make coat or binder precursor of the invention applied to a backing can vary depending on the grade of the abrasive particles to be used. For instance, finer grade abrasive particles will generally require less make coat to bond the abrasive particles to the backing. Sufficient amounts of binder precursor must be provided to satisfactorily bond the abrasive particles. However, if the amount of binder precursor applied is too great, the abrasive particles may become partially or totally submerged in the make coating, which is undesirable. In general, the application rate of the binder precursor composition of this invention (on a solvent free basis) is between about 4 to 300 g/m$^2$, preferably between about 20 to about 30 g/m$^2$.

Preferably, the make coat binder precursor is applied to the abrasive article backing by any of the methods described above, and once so applied is exposed to an energy source to initiate at least partial cure of the epoxy resin and the polyfunctional acrylate component, if present. Curing of the make coat binder precursor begins upon exposure of the binder precursor to an appropriate energy source and continues for a period of time thereafter. The energy source is selected for the desired processing conditions and to appropriately activate the epoxy catalyst. The energy may be actinic (for example, radiation having a wavelength in the ultraviolet or visible region of the spectrum), accelerated particles (for example, electron beam radiation), or thermal (for example, heat or infrared radiation). Preferably, the energy is actinic radiation (that is, radiation having a wavelength in the ultraviolet or visible spectral regions). Suitable sources of actinic radiation include mercury, xenon, carbon arc, tungsten filament lamps, sunlight, and so forth.

Ultraviolet radiation, especially from a medium pressure mercury arc lamp, is most preferred. Exposure times may be from less than about 1 second to 10 minutes or more (to preferably provide a total energy exposure from about 0.1 to about 10 Joule/square centimeter ($J/cm^2$)) depending upon both the amount and the type of reactants involved, the energy source, web speed, the distance from the energy source, and the thickness of the make coat to be cured.

The binder precursors of the invention may also be cured by exposure to electron beam radiation. The dosage necessary is generally from less than 1 megarad to 100 megarads or more. The rate of curing may tend to increase with increasing amounts of photocatalyst and/or photoinitiator at a given energy exposure or by use of electron beam energy with no photoinitiator. The rate of curing also may tend to increase with increased energy intensity.

Use of the cationic organometallic salt as epoxy photocatalyst allows delayed cure, even in the absence of polyols, which enables the binder precursor to retain its pressure sensitive properties for a time sufficient to permit abrasive particles to be adhered thereto after the binder precursor has been exposed to the energy source.

The abrasive particles may be applied until the make coat binder precursor has sufficiently cured that the particles will no longer adhere, although to increase the speed of a commercial manufacturing operation, it is desirable to apply the abrasive particles as soon as possible, typically within a few seconds of the make coat binder precursor having been exposed to the energy source. The abrasive particles can be applied by drop coating, preferably, electrostatic coating, or magnetic coating according to conventional techniques in the field. An example of a process that may be used to make the abrasive articles of the invention can be found in U.S. application Ser. No. 08/710,596, entitled "Coated Abrasive Article," filed Sep. 20, 1996, now U.S. Pat. No. 5,766,277, incorporated herein by reference.

The time to reach full cure may be accelerated by post curing of the make coat with heat, such as in an oven. Post curing can also affect the physical properties of the make coat and is generally desirable. The time and temperature of the post cure will vary depending upon the glass transition temperature of the ethylene-vinyl acetate copolymer, the concentration of the initiator, the energy exposure conditions, and the like. Post cure conditions can range from less than a few seconds at a temperature of about 150° C. to longer times at lower temperatures. Typical post cure conditions are about one minute or less at a temperature of about 100° C.

In an alternative manufacturing approach, the make coat binder precursor is applied to the backing and the abrasive particles are then projected into the make coat binder precursor followed by exposure of the make coat binder precursor to an energy source.

Size coat 20 may be subsequently applied over the abrasive particles and the make coat as a flowable liquid by a variety of techniques such as roll coating, spray coating, gravure coating, or curtain coating and can be subsequently cured by drying, heating, or with electron beam or ultraviolet light radiation. The particular curing approach may vary depending on the chemistry of the size coat. Optional supersize coating 22 may be applied and cured or dried in a similar manner.

Optional back size coating 24 may be applied to backing 12 using any of a variety of conventional coating techniques such as dip coating, roll coating, spraying, Meyer bar, doctor blade, curtain coating, gravure printing, thermomass transfer, flexographic printing, screen printing, and the like.

In an alternate backing arrangement, the back side of the abrasive article may contain a loop substrate. The purpose of the loop substrate is to provide a means that the abrasive article can be securely engaged with hooks from a support pad. The loop substrate may be laminated to the coated abrasive backing by any conventional means. The loop substrate may be laminated prior to the application of the make coat precursor or alternatively, the loop substrate may be laminated after the application of the make coat precursor.

In another aspect, the loop substrate may in essence be the coated abrasive backing. The loop substrate will generally comprise a planar surface with the loops projecting from the back side of the front side of the planar surface. The make coat precursor is coated on this planar surface. In this aspect, the make coat precursor is directly coated onto the planar surface of the loop substrate. In some instances, the loop substrate may contain a presize coating over the planar surface which seals the loop substrate. This presize coating may be a thermosetting polymer or a thermoplastic polymer. Alternatively, the make coat precursor may be directly coated onto the non-looped side of an unsealed loop substrate. The loop substrate may be a chenille stitched loop, an extruded bonded loop, a stitchbonded loop substrate or a brushed loop substrate (for example, brushed polyester or nylon). Examples of typical loop backings are further described in U.S. Pat. Nos. 4,609,581 and 5,254,194, both of which are incorporated herein by reference.

The loop substrate may also contain a sealing coat over the planar surface to seal the loop substrate and prevent the make coat precursor from penetrating into the loop substrate. Additionally, the loop substrate may comprise a thermoplastic sealing coat and projecting from the thermoplastic sealing are a plurality of corrugated fibers. This plurality of corrugated fibers actually forms a sheet of fibers. It is preferred that these fibers have arcuate portions projecting in the same direction from spaced anchor portions. In some instances, it is preferred to coat directly onto the planar surface of the loop substrate to avoid the cost associated with a conventional backing. The make coat binder precursor can be formulated and coated such that the make coat precursor does not significantly penetrate into the loop substrate. This results in a sufficient amount of make coat precursor to securely bond the abrasive particles to the loop substrate.

Likewise, the back side of the abrasive article may contain a plurality of hooks; these hooks are typically in the form of sheet like substrate having a plurality of hooks protruding from the back side of the substrate. These hooks will then provide the means of engagement between the coated abrasive article and a support pad that contains a loop fabric. This hooked substrate may be laminated to the coated abrasive backing by any conventional means. The hooked substrate may be laminated prior to the application of the make coat precursor or alternatively, the hooked substrate may be laminated after the application of the make coat precursor. In another aspect, the hooked substrate may in essence be the coated abrasive backing. In this scenario, the make coat precursor is directly coated onto the hooked substrate. In some instances, it is preferred to coat directly onto a hooked substrate to avoid the cost associated with a conventional backing. Additional details on the use of hooked backings or lamination of hooks can be found in U.S. Pat. No. 5,505,747 (Chesley et al.), incorporated herein by reference.

The binder precursors of the invention provide a balance of highly desirable properties. As solvent free formulations, they are easily applied using conventional hot melt dispensing systems. Consequently, they can be supplied as pressure sensitive adhesive films well suited for lamination to a backing. The inclusion of an ethylene-vinyl acetate copolymer provides the binder precursors with pressure sensitive properties which facilitates the application of the abrasive particles thereto. The provision of a polyether polyol of appropriate molecular weight and functionality provides the make coats of the invention with an open time subsequent to energy exposure that permits the abrasive particles to be projected into the binder precursor after it has been exposed to energy. The incorporation of a polyfunctional acrylate component in the make coat provides superior rheology control.

More specifically, the binder precursor formulations used in the present invention have a lower cost, longer open time, and better film-forming properties than make resins containing only epoxy and thermoplastic polyester. As a result of the enhanced film forming properties, the binder compositions of the present invention require less thermoplastic in the formulation, further reducing cost and improving the elevated-temperature properties of the material.

The invention will be more fully understood with reference to the following nonlimiting examples in which all parts, percentages, ratios, and so forth, are by weight unless otherwise indicated.

Abbreviations used in the examples have the definitions shown in the following schedule.

| | |
|---|---|
| DS1227 | a high molecular weight polyester under the trade designation "DYNAPOL S1227" commercially available from Creanova, Piscataway, NJ |
| DS1402 | a high molecular weight polyester with low crystallinity under the trade designation "DYNAPOL S1402" commercially available from Creanova, Piscataway, NJ |
| EL 310 | an ethylene-vinyl acetate copolymer (25% vinyl acetate) commercially available from E. I. Du Pont de Nemours and Co. (Wilmington, DE) under the trade designation "ELVAX 310" |
| EL 220 | an ethylene-vinyl acetate copolymer (28% vinyl acetate) commercially available from E. I. Du Pont de Nemours and Co. (Wilmington, DE) under the trade designation "ELVAX 220" |
| EL 140 | an ethylene-vinyl acetate copolymer (33% vinyl acetate) commercially available from E. I. Du Pont de Nemours and Co. (Wilmington, DE) under the trade designation "ELVAX 140" |
| L700 | an ethylene-vinyl acetate copolymer commercially available from Bayer Corp. (Pittsburgh, PA) under the trade designation "LEVAPREN 700" |
| E828 | a bisphenol A epoxy resin under the trade designation "EPON 828" (epoxy equivalent wt. of 185–192 g/eq) commercially available from Shell Chemical, Houston, TX |
| E1001 | a bisphenol A epoxy resin under the trade designation "EPON 1001F" (epoxy equivalent wt. of 525–550 g/eq) commercially available from Shell Chemical, Houston, TX |
| E4221 | a cycloaliphatic epoxy resin under the trade designation "ERL 4221 (epoxy equivalent wt. of 126 g/eq) commercially available from Union Carbide Corp., Danbury, CT |
| CHDM | cyclohexanedimethanol |
| TMPTA | trimethylol propane triacrylate commercially available from Sartomer Co., Exton, PA under the trade designation "SR351" |
| KB1 | 2,2-dimethoxy-1,2-diphenyl-1-ethanone commercially available from Ciba Specialty Chemicals under the trade designation "IRGACURE 651" or commercially available from Sartomer Co., Exton, PA under the trade designation "KB1" per se |
| COM | $\eta^5$-[xylenes (mixed isomers)]eta$^5$-cyclopentadienyliron(1+) hexafluoroantimonate (1−) (acts as a catalyst) |
| AMOX | di-t-amyloxalate (acts as an accelerator) |
| CRY | cryolite |
| AO | fused aluminum oxide |
| HTAO | heat treated fused aluminum oxide |

TEST PROCEDURES

The Examples and Comparative Examples described below were tested according to the following test procedure.

TEST #1: Schiefer Test Procedure

The coated abrasive article for each example was converted into a 10.2 cm diameter disc and secured to a foam back-up pad by means of a pressure sensitive adhesive. The coated abrasive disc and back-up pad assembly was installed on a SCHIEFER testing machine, and the coated abrasive disc was used to abrade a donut shaped cellulose acetate butyrate polymer or 1018 mild steel workpiece. The load was 4.5 kg. The endpoint of the test was 500 revolutions or cycles of the coated abrasive disc. The amount of cellulose acetate butyrate polymer removed was measured at the end of the test. The mineral pick-up achieved and cut determined by TEST #1 for each example, are summarized in the data below.

MELT BLENDING TO FORM EVA/EPOXY BLENDS

Two hundred gram samples were prepared by melting the EVA copolymer in a one quart paint can at 100–150° C. adding liquid epoxy (if E1001 is added, it is melted first), blending with an air mixer, adding remainder of the liquid epoxy and cyclohexanedimethanol (CHDM) if present (2.4% of total in all examples in which it was used), blending again, reducing the temperature to 100–120° C., and adding CpFeXylenes$^+$ SbF$_6^-$ (COM) and di-tert-amyl oxalate (AMOX), 0.6–1% each. Resins were coated onto release liner (silicone release on PET film) using a hot knife at 95–100° C., 0.05–0.10 mm thick. Thicker samples were used for physical property testing (DMA and DSC). Thinner coatings 0.05 mm were laminated onto abrasives backings, including 36×34 threads/cm polycotton for utility cloth products, a stem web substrate, and a variety of paper backings. All make resins containing EVA copolymer were melt blended except those containing L700.

SOLVENT BLENDING TO FORM EVA/EPOXY BLENDS

L700 was dissolved in ethyl acetate or methyl ethyl ketone at 25–40% solids, epoxy and CHDM (if present) added, and solvent stripped off under vacuum at 60–90° C. Photocatalyst system was added (adding COM and AMOX, 0.6–1% each) to the melt at 100–120° C., mixed with air mixer, and coated onto a substrate as described above. Solvent blending of the binder resins of the invention is not preferred, however, the measured physical properties of solvent blended and melt blended binders are expected to be within experimental error.

The preferred method of blending the binder resins containing higher vinyl acetate EVA copolymers is as follows: EVA copolymer pellets were fed into a co-rotating intermeshing twin screw extruder and melted between a temperature of 80 and 140° C. Solid epoxy resin (E1001) flakes were melted and pumped as a liquid into a port downstream of the thermoplastic. Finally, all other components (E828, COM, AMOX, and optionally CHDM, TMTPA, and KB1) were mixed at a temperature of 75° C. in a batch process. The resulting homogenous liquid was pumped into an extruder downstream of the solid epoxy and thermoplastic. The extrudate was collected in silicone-lined boxes and stored as a solid at room temperature in the dark. In this form it was conveniently remelted as needed for further use.

DYNAMIC MECHANICAL ANALYSIS (DMA):

Samples were prepared by coating curable hot melt between two polyester release liners, 2–5 mils thick. Coatings were exposed to approximately 3 J/cm2 of radiant energy from TLD 15W/03 bulbs (Philips B.V., Holland) through release liners. Exposed samples were then placed in an oven at 100–110° C. for 30 min to ensure cure. Strips of cured film were cut 1.0 cm wide, approximately 2–3 cm long. A Seiko Instruments DMA 200 Rheometer (Seiko Instruments, Torrance, Calif.) equipped with a tensile sample fixture was used. Separation of the jaws was 10 mm. The temperature ramp was 2 degrees per minute from −80 to 250° C., at a single frequency of 1 Hz. DMA data are displayed in Tables 1–3.

TABLE 1

Material Properties of EVA/Epoxy Melt processable Resins

| Formulation | % Vinyl Acetate in EVA | DMA $T_g$ (° C.) | DMA E' (25° C., MPa) | DMA E' (100° C., Mpa) |
|---|---|---|---|---|
| 40% EVA (EL310) 60% Epoxy | 25 | −30° C./134 | 700 | 300 |
| 40% EVA (EL220) 60% Epoxy | 28 | −31° C./125 | 130 | 60 |
| 40% EVA (EL 140) 60% Epoxy | 33 | −28° C./116 | 80 | 20 |
| 10% EVA (L700) 90% Epoxy (E828) No CHDM | 70 | −3° C./150 | 700 | 300 |
| 20% EVA (L700) 80% Epoxy (E828) No CHDM | 70 | 53° C./125 | 1000 | 130 |
| 10% EVA (L700) 90% Epoxy (E1001) No CHDM | 70 | 110 | 2100 | 400 |
| 20% EVA (L700) 80% Epoxy (E 1001) No CHDM | 70 | 117 | 1300 | 400 |

TABLE 2

Material Properties of Melt Processable EVA/Epoxy Blends

| Formulation | % Vinyl Acetate in EVA | DMA $T_g$ (° C.) | DMA E' (25° C., MPa) | DMA E' (100° C., Mpa) |
|---|---|---|---|---|
| 10% EVA (L700) 90% Epoxy (E 1001) CHDM | 70 | 99 | 1600 | 30 |
| 15% EVA (L700) 85% Epoxy (E 1001) CHDM | 70 | 101 | 1400 | 60 |
| 20% EVA (L700) 80% Epoxy (E 1001) CHDM | 70 | 97 | 1100 | 20 |
| 25% EVA (L700) 75% Epoxy (E 1001) CHDM | 70 | 102 | 1100 | 60 |

TABLE 3

Material Properties of EVA/Epoxy Blends; Effects of Cryolite Filler.

| Formulation | % Vinyl Acetate in EVA | DMA $T_g$ (° C.) | DMA E' (25°, MPa) | DMA E' (100°, MPa) |
|---|---|---|---|---|
| 15% EVA (L700) 85% Epoxy (6:4 E1001:E828) No CHDM | 70 | 138 | 1000 | 600 |
| 12% EVA (L700) 68% Epoxy (6:4 E1001:E828) No CHDM 20% Cryolite | 70 | 138 | 1800 | 860 |
| 12% EVA (L700) 68% Epoxy (6:4 E1001:E828) CHDM 20% Cryolite | 70 | 97 | 1400 | 750 |
| 15% EVA (L700) 85% Epoxy (6:4 E1001:E828) CHDM | 70 | 123 | 520 | 290 |

The physical properties of the EVA/epoxy blends show that the most compatible blends are those containing EVA copolymers having vinyl acetate content near 70% by weight. Preferred compositions for abrasive applications are those compositions containing EVA copolymers having vinyl acetate content of about 60–80% by weight, an EVA copolymer concentration in the range of 10–20% by weight relative to epoxy resin, and no chain extender (CHDM). These materials have Knoop Hardness (KHN) values of about ten, comparable to that of epoxy/polyester/polyacrylate melt processable resin systems. The addition of fillers is also possible; the use of cryolite is illustrated in Table 3. Preferred binder compositions have glass transition temperatures ($T_g$'s) well over 60° C. after curing, for best abrasive performance.

PREPARATION OF COMPARATIVE EXAMPLE A AND EXAMPLE 1

Comparative Example A was "3M Grade P180 216U Production Fre-Cut A Weight Paper", commercially available from Minnesota Mining and Manufacturing Company of St. Paul, Minn. Example 1 comprised an abrasive construction having a 115g/m$^2$ paper backing from Kammerer GmbH, (Osnabruck, Germany), an EVA/epoxy blend make coat (15% L700, 85% E1001, 0.6% COM, and 0.6% AMOX), P180 AO applied electrostatically into the make coat, a radiation-curable size coat (60% E828, 20% E4221, 20% DIPT, and 1.0% COM), and a zinc stearate supersize as described in U.S. Pat. No. 5,611,825 as "A3469", incorporated by reference herein. Representative (typical) coating weights for Example 1 were: make weight=100 g/m$^2$; mineral weight=120 g/m$^2$; size weight=50 g/m$^2$; supersize weight=25 g/m$^2$ The Schiefer Cut Results Were:

| EXAMPLE | SCHIEFER CUT (g/500 cycles) |
|---|---|
| Comparative Example A | 2.78 |
| Example 1 | 3.14 |

The cut performance of Example 1 is approximately 13% better than that of Comparative Example A.

PREPARATION OF COMPARATIVE EXAMPLES B AND C AND EXAMPLES 2 AND 3

Comparative examples B and C were blended at a temperature of 140° C. The acrylate and epoxy catalysts and the photoinitiator, were added into the molten mixture and blended just before coating. Examples 2 and 3 were solvent blended (not preferred); the epoxy resins and the EVA copolymer were dissolved in methyl ethyl ketone. The solvent was gradually removed in a vacuum oven while the temperature was raised to 120° C. After 30 minutes at a temperature of 120° C. and a vacuum of 1.0 Torr, it was assumed that all of the solvent had been removed. The samples were moved to a conventional oven and the rest of the components were added as in Comparative Examples B and C. Preferably, the samples are melt blended as described above. The compositions (parts by weight) are described in Table 4.

Approximately 0.08 mm thick coatings were knife coated onto a paper backing (150 g/m² from UPM-Kymmene, Pietarsaari, Finland), with both the knife and coating bed at a temperature of approximately 130° C. Additional samples of Examples 2 and 3 were coated onto a silicone-treated polyester release liner and transfer coated at room temperature to the same paper backing. No difference was seen in either the mineral coating or product performance between the samples coated directly onto the backing and those which had been transfer coated. The make coat weight for each sample was approximately 75 g/m².

The coatings were irradiated with a 236 Watt/cm Fusion Systems "D" bulb at a web speed of 15 m/min. The irradiated coatings were then electrostatically coated with grade P80 HTAO mineral. The make resin was then heated at 120° C. for 10 minutes to finally cure the resin.

A size resin containing 40% E828, 30% E4221, 30% TMPTA, 1% KB1 and 1% COM was dispersed in methyl ethyl ketone and brushed onto the samples at an approximate weight of 120 g/m² (dry weight). These coated samples were irradiated by a 236 W/cm Fusion "D" bulb at 15 m/min, and cured for 10 minutes at 120° C.

Table 5 shows the grade P80 mineral coating weights and the Schiefer Test performance results of the above Examples and Comparative Examples.

TABLE 4

| Formulation | Comparative B | Comparative C | Example 2 | Example 3 |
|---|---|---|---|---|
| DS 1227 (pbw) | 28 | 21 | 0 | 0 |
| L 700 (pbw) | 0 | 0 | 28 | 21 |
| E 828 (pbw) | 37 | 41 | 39 | 43 |
| E 1001 (pbw) | 26 | 29 | 27 | 30 |
| CHDM (pbw) | 3 | 3 | 0 | 0 |
| TMTPA (pbw) | 3.8 | 3.8 | 3.8 | 3.8 |
| KB1 (pbw) | 1 | 1 | 1 | 1 |
| COM (pbw) | 0.6 | 0.6 | 0.6 | 0.6 |
| AMOX (pbw) | 0.6 | 0.6 | 0.6 | 0.6 |

TABLE 5

| Sample | Mineral Weight (g/m²) | Mild steel Schiefer (cut: g/500 cycles) | CAB Schiefer (cut: g/500 cycles) |
|---|---|---|---|
| Comparative B | 316 | 0.68 | 1.929 |
| Comparative C | 375 | 0.74 | 2.025 |
| Example 2 | 418 | 0.66 | 1.617 |
| Example 3 | 453 | 0.74 | 1.834 |

The data in Table 5 indicate that the make resin systems of both Examples 2 and 3 more readily accept mineral particles than the make resin systems of both Comparative Examples B and C. The make resin systems of Examples 2 and 3 likely have more tackiness over an extended time window due to the lower rate of crystallization than the make resin systems of Comparative Examples B and C.

The Schiefer test is known as both a sharpness (mineral orientation) and an antiloading test. Since antiloading is known to be enhanced by peripheral antiloading additives (not present here), mineral orientation, and open coated constructions, that is, those with about 20–30% less abrasive particle (mineral) concentration, Examples 2 and 3 having higher mineral or abrasive particle coatings would not be expected to perform better than Comparative Examples B and C.

By comparison, the results of the mild steel Schiefer test indicate that all four constructions perform similarly (adequately) and appear unaffected by both the concentration (amount) of mineral present and the type of make coat composition.

Various modifications and alterations of this invention will become apparent to those skilled in the art without departing from the scope and spirit of this invention, and it should be understood that this invention is not to be unduly limited to the illustrated embodiment set forth herein.

What is claimed is:

1. A coated abrasive article, comprising:
   a) a backing having a front surface and a back surface;
   b) a crosslinked first binder on said front surface of said backing, wherein said first binder is formed from a first binder precursor, said first binder precursor is an energy-curable composition formed by mixing components comprising:
      i) about 30 to about 95 weight percent of an epoxy resin,
      ii) about 5 to about 70 weight percent of an ethylene-vinyl acetate copolymer resin wherein the sum of i and ii is 100 weight percent, and
      iii) an effective amount of a curing agent for crosslinking said epoxy resin; and
   c) a plurality of abrasive particles, wherein said abrasive particles are at least partially embedded in said first binder.

2. The coated abrasive article of claim 1, further comprising a second binder over said first binder and said abrasive particles.

3. The coated abrasive article of claim 1, wherein said first binder precursor is a melt processable resin.

4. The coated abrasive article of claim 1, wherein said first binder precursor is a hot melt pressure sensitive adhesive.

5. The coated abrasive article of claim 1, wherein said curing agent is a cationic photocatalyst capable of generating an acid to catalyze polymerization of said epoxy resin.

6. The coated abrasive article of claim 5, wherein said photocatalyst is an onium salt or a cationic organometallic salt.

7. The coated abrasive article of claim 2, wherein said ethylene-vinyl acetate copolymer comprises not less than about 30 weight percent vinyl acetate.

8. The coated abrasive article of claim 2, wherein said ethylene-vinyl acetate copolymer comprises from about 40 to about 95% weight percent vinyl acetate.

9. The coated abrasive article according to claim 1, wherein said ethylene-vinyl acetate copolymer comprises from about 50 to about 90% weight percent vinyl acetate.

10. The coated abrasive article according to claim 1, wherein said ethylene-vinyl acetate copolymer comprises from about 60 to about 80% weight percent vinyl acetate.

11. The coated abrasive article of claim 2, wherein said epoxy resin comprises a glycidyl ether monomer of the formula:

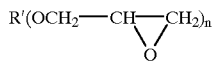

where R' is aliphatic or aromatic and n is an integer of 1 to 6.

12. The coated abrasive article according to claim 1, wherein said binder precursor contains from about 70 to about 90 weight percent epoxy resin.

13. The coated abrasive article according to claim 1, wherein said binder precursor contains from about 10 to about 30 weight percent ethylene-vinyl acetate copolymer.

14. The coated abrasive article according to claim 2, wherein said binder precursor further contains a thermoplastic polyester.

15. The abrasive article according to claim 1, wherein said binder precursor further contains a filler material.

16. The coated abrasive article of claim 2, wherein said second binder is a glue or a cured resinous adhesive.

17. The coated abrasive article of claim 2, further comprising a third binder over said second binder.

18. The coated abrasive article of claim 2, wherein said backing is selected from the group consisting of a fabric, a metal foil, a plastic film, a foam, paper, and a multicomponent material.

19. The coated abrasive article of claim 2, wherein said backing is a fabric material selected from the group consisting of a woven fabric and a nonwoven fabric.

20. The coated abrasive article of claim 2, wherein said backing is a material selected from the group consisting of a hooked substrate, a loop fabric, a vulcanized fiber material, and a laminate.

21. The coated abrasive article of claim 2, wherein said backing is a porous material.

22. The coated abrasive article of claim 2, wherein said back surface of said backing comprises a pressure sensitive adhesive.

23. The coated abrasive article of claim 2, wherein said first binder further comprises an additive selected from the group consisting of fillers, fibers, dyes, pigments, wetting agents, plasticizers, and combinations thereof.

24. The coated abrasive article of claim 17, wherein the third binder comprises a non-loading coating.

25. The coated abrasive article of claim 24, wherein said non-loading coating comprises a metal salt of fatty acid, phosphate ester, metal salt of a phosphate ester, or combinations thereof.

26. The coated abrasive article of claim 2, wherein said coated abrasive article has a converted shape or form selected from the group consisting of sheets, discs, triangular shaped sheets, square sheets, rectangular sheets, and rolls.

27. The coated abrasive article of claim 2, wherein said coated abrasive article is in the form of concatenation comprising a plurality of individual abrasive discs joined together to form a roll.

28. A coated abrasive article, comprising:
a) a backing having a front surface and a back surface;
b) a crosslinked first binder on said front surface of said backing, wherein said first binder is formed from a first binder precursor, said first binder precursor is an energy-curable composition formed by mixing components comprising:
  i) about 30 to about 95 weight percent of an epoxy resin,
  ii) about 5 to about 70 weight percent of thermoplastic, said thermoplastic consisting essentially of an ethylene-vinyl acetate copolymer resin, wherein the sum of i and ii is 100 weight percent, and
  iii) an effective amount of a curing agent for crosslinking said epoxy resin; and
c) a plurality of abrasive particles, wherein said abrasive particles are at least partially embedded in said first binder.

29. A coated abrasive article, comprising:
a) a backing having a front surface and a back surface;
b) a crosslinked first binder on said front surface of said backing, wherein said first binder is formed from a first binder precursor, said first binder precursor is an energy-curable composition formed by mixing components comprising:
  i) about 2 to about 98 weight percent of an epoxy resin,
  ii) about 1 to about 90 weight percent of an ethylene-vinyl acetate copolymer resin,
  iii) about 0.1 to about 20 weight percent of a polyfunctional acrylate component the sum of i, ii, and iii is 100 weight percent, and
  iv) an effective amount of a curing agent for crosslinking said epoxy resin; and
c) a plurality of abrasive particles, wherein said abrasive particles are at least partially embedded in said first binder.

30. The abrasive article according to claim 29, wherein said binder precursor is a molten or a solid melt-processable composition.

31. The coated abrasive article according to claim 30, wherein said epoxy resin comprises at least one of an aliphatic, alicyclic, aromatic, and heterocyclic polyepoxide.

32. The coated abrasive article according to claim 29, wherein said first binder precursor further comprises a means for crosslinking said polyfunctional acrylate.

33. The coated abrasive article according to claim 32, wherein said curing agent for crosslinking said epoxy resin is a photocatalyst or a thermal curing agent.

34. The coated abrasive article according to claim 33, wherein the photocatalyst is a cationic photocatalyst capable of generating an acid to catalyze polymerization of said epoxy resin.

35. The coated abrasive article according to claim 32, wherein said means of crosslinking said polyfunctional acrylate component comprises a free radical initiator selected from the group consisting of a thermal initiator and a photoinitiator.

36. The coated abrasive article according to claim 30, wherein the ethylene-vinyl acetate copolymer contains from about 20 to about 99 weight percent vinyl acetate.

37. The coated abrasive article according to claim 30, wherein the ethylene-vinyl acetate copolymer contains from about 60 to about 80 weight percent vinyl acetate.

38. The coated abrasive article of claim 32, wherein the binder precursor contains from about 50 to about 94 weight percent of an epoxy resin, from about 5 to about 50 weight percent of an ethylene-vinyl acetate copolymer containing from about 40 to about 90 weight percent vinyl acetate, and from about 0.1 to about 15 weight percent of a polyfunctional acrylate component.

* * * * *